United States Patent
Elliott et al.

(10) Patent No.: US 7,848,067 B2
(45) Date of Patent: Dec. 7, 2010

(54) SOFT START MOTOR CONTROL USING BACK-EMF

(75) Inventors: Robert Quincy Elliott, Cary, NC (US); Michael Scott Britton, Fuquay Varina, NC (US); Mark Andrew Sporer, Apex, NC (US)

(73) Assignee: Caterpillar S.A.R.L., Geneva (CH)

( * ) Notice: Subject to any disclaimer, the term of this patent is extended or adjusted under 35 U.S.C. 154(b) by 406 days.

(21) Appl. No.: 12/081,459

(22) Filed: Apr. 16, 2008

(65) Prior Publication Data

US 2009/0263110 A1 Oct. 22, 2009

(51) Int. Cl.
*H02H 7/08* (2006.01)

(52) U.S. Cl. .............. 361/29; 361/23; 361/31; 318/430; 318/268; 318/772; 318/784; 323/208; 323/209; 323/276

(58) Field of Classification Search .......... 361/29, 361/23, 31; 318/430, 268, 772, 784; 388/816, 388/822, 823
See application file for complete search history.

(56) References Cited

U.S. PATENT DOCUMENTS

| | | | |
|---|---|---|---|
| 3,743,907 A * | 7/1973 | Dosch et al. ........... 318/271 |
| 4,008,423 A * | 2/1977 | Christianson et al. ....... 318/139 |
| 4,254,343 A | 3/1981 | Miller | |
| 4,628,235 A | 12/1986 | Goings | |
| 4,633,382 A | 12/1986 | Upadhyay et al. | |
| 4,831,313 A * | 5/1989 | Beilfuss ............... 388/822 |
| 5,408,573 A * | 4/1995 | Jamieson et al. ........ 388/815 |
| 5,914,577 A | 6/1999 | Furnival | |
| 5,923,143 A | 7/1999 | Cosan et al. | |
| 6,465,976 B1 * | 10/2002 | Cheng ................. 318/430 |
| 6,864,648 B1 | 3/2005 | Stedman | |
| 7,068,010 B2 | 6/2006 | Youm | |
| 7,518,837 B2 * | 4/2009 | Tseng et al. ............. 361/29 |
| 2004/0055479 A1 | 3/2004 | Bunce et al. | |
| 2004/0105664 A1 | 6/2004 | Ivankovic | |
| 2004/0228051 A1 | 11/2004 | Dragoi et al. | |
| 2006/0127183 A1 | 6/2006 | Bishop, Jr. | |

* cited by examiner

*Primary Examiner*—Rita Leykin
(74) *Attorney, Agent, or Firm*—Finnegan, Henderson, Farabow, Garrett & Dunner LLC

(57) ABSTRACT

A method of controlling in-rush current to a DC motor is disclosed. The method may include operating the DC motor in a first mode including applying back-EMF across a relay coil to maintain the relay in an open configuration when the back-EMF is below a predetermined voltage. The method may also include operating the DC motor in a second mode including applying the back-EMF across the relay coil to maintain the relay in a closed configuration when the back-EMF is equal to or above the predetermined voltage.

20 Claims, 5 Drawing Sheets

SOFT START MOTOR CONTROL USING BACK-EMF

TECHNICAL FIELD

The present disclosure relates generally to soft start motor control and, more particularly, to soft start motor control using back-EMF.

BACKGROUND

Machines, including skid steer loaders, wheel loaders, backhoes, track-type tractors, and other similar types of construction and mining equipment, are used for a variety of tasks. These machines typically include a blower motor. Power is provided to the blower motor and other subsystems of the machine. The blower motor generally includes a motor, a motor switch, and a key relay switch.

On start-up or in a stall condition, a low voltage motor may be subject to a large in-rush current. On a 12 Volt machine, the starting in-rush current may exceed 80 Amps. A large in-rush current may damage electrical components. It would be desirable to limit the in-rush current on start up or in a stall condition. The general method of limiting the in-rush current is to attach a relay and a small resistor, usually a few ohms, in parallel. At start up, the relay is open and the current is limited by the resistor. After predetermined conditions are met, such as the motor voltage reaches a certain level, the relay is closed, usually by a controller. The current is no longer controlled by the resistor.

One soft start motor control system is described in U.S. Patent Publication No. 2004/0228051 (the '051 publication) by Dragoi et al. published on Nov. 18, 2004. The '051 publication describes initially commanding the motor to run at low speed (motor connected to the power supply via a resistor) and then switch to high speed (motor connected directly to the power supply). The motor speed signal is generated by the Motor Speed Sensing circuit and transmitted to the Motor Speed Control and Protection circuit. The Motor Speed Control and Protection circuit commands the relays to open or close and transition the motor between low speed and high speed.

Although the soft start motor system described in the '051 publication may prevent high in-rush current on start-up, it may still lack efficiency and practical applicability. Specifically, because the '051 publication requires both a Motor Speed Sensing circuit and a Motor Speed Control and Protection circuit, some additional costs and circuit complexity may be unnecessarily incurred. These sensing and control circuits may also consume space within the motor compartment. Also, because the switch from low speed to high speed is controlled by a control circuit, which receives input from a sensing circuit, a failure or degradation in performance of either or both the sensing circuit or control circuit may cause the relays to be improperly configured for placing the motor in low speed or high speed as required by the circumstances.

The disclosed soft start motor control system and method are directed to improvements in the existing technology.

SUMMARY

One aspect of the disclosure is directed to a method of controlling in-rush current to a DC motor. The method may include operating the DC motor in a first mode including applying back-EMF across a relay coil to maintain the relay in an open configuration when the back-EMF is below a predetermined voltage. The method may also include operating the DC motor in a second mode including applying the back-EMF across the relay coil to maintain the relay in a closed configuration when the back-EMF is equal to or above the predetermined voltage.

Another aspect of the disclosure is directed to a soft start motor control for a DC motor. The soft start motor control may include at least a motor switch, one or more resistors, and a relay. The relay may be configured to open when a back-EMF of the DC motor across a relay coil is below a predetermined voltage, with current to the DC motor being controlled by the one or more resistors. The relay may be further configured to close when the back-EMF of the DC motor across the relay coil is equal to or above the predetermined voltage, with current to the DC motor traveling across the relay.

DETAILED DESCRIPTION

Figure 1:
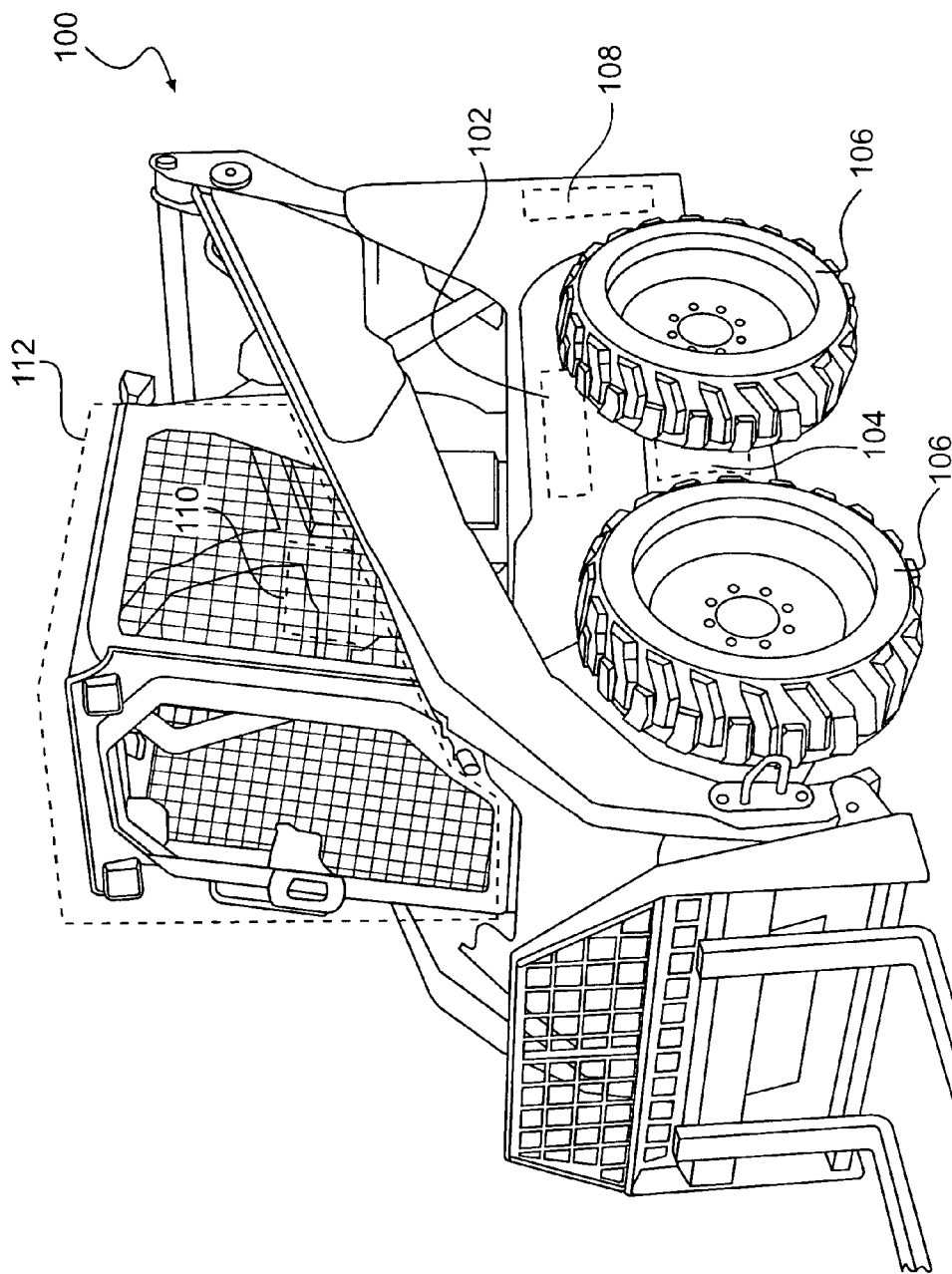
FIG. 1 is a pictorial illustration of an exemplary disclosed machine.

FIG. 1 illustrates an exemplary disclosed machine 100 having a plurality of components that cooperate to perform some type of task associated with an industry such as mining, construction, agriculture, transportation, or any other industry. While machine 100 is illustrated as a skid steer loader, machine 100 may embody any type of mobile machine having one or more systems operable to perform a particular function. For example, machine 100 may include a wheel loader, a backhoe, or any other type of machine. Machine 100 may include, among other things, a power source 102, a transmission 104, one or more traction devices 106, and a climate control system 108, all schematically and diagrammatically illustrated and designated in FIG. 1.

Power source 102 may produce a mechanical power output and embody an internal combustion engine such as, for example, a diesel engine, a gasoline engine, a gaseous fuel-powered engine, or any other type of engine apparent to one skilled in the art. Power source 102 may, alternatively, embody a non-combustion source of power such as a battery, a fuel cell, a motor, or any other suitable source of power. In one exemplary embodiment, power source 102 may create a power output. The power output may be used to provide power to machine 100.

Transmission 104 may include components that cooperate to transmit energy from power source 102 to traction devices 106. Transmission 104 may include hydraulic pumps, and a driveshaft assembly to receive a torque input. Transmission 104 may further include one or more motors fluidly connected to the hydraulic pumps.

Traction devices 106 may include wheels located on either side of machine 100 and driven by power source 102 to affect the propulsion and yaw of machine 100. Traction devices 106 may include one or more driven components, e.g., an axle or a sprocket; one or more non-driven components, e.g., a guide wheel or a hub; and/or additional components known in the art. The driven components may be operatively connected to power source 102 via transmission 104 to receive mechanical power therefrom and provide movement to traction devices 106, thereby propelling machine 100. It is contemplated that traction devices 106 may additionally or alternatively include tracks, belts, or other traction devices 106 in any appropriate number. It is contemplated that traction devices 106 may be hydraulically controlled, mechanically controlled, electronically controlled, or controlled in any other manner known in the art.

Climate control system 108 may be any type of on-board HVAC system relying on air circulation for climate control. For example, climate control system 108 may include a control system accepting control settings for its operation. These settings may be controlled by an operator via an input device 110 located, for example, in machine 100 compartment 112, or may be controlled automatically by an appropriate controller (not shown). Such settings may include operational modes, such as a heating mode, a cooling mode, a fan mode, and/or a target temperature mode.

Figure 2A:
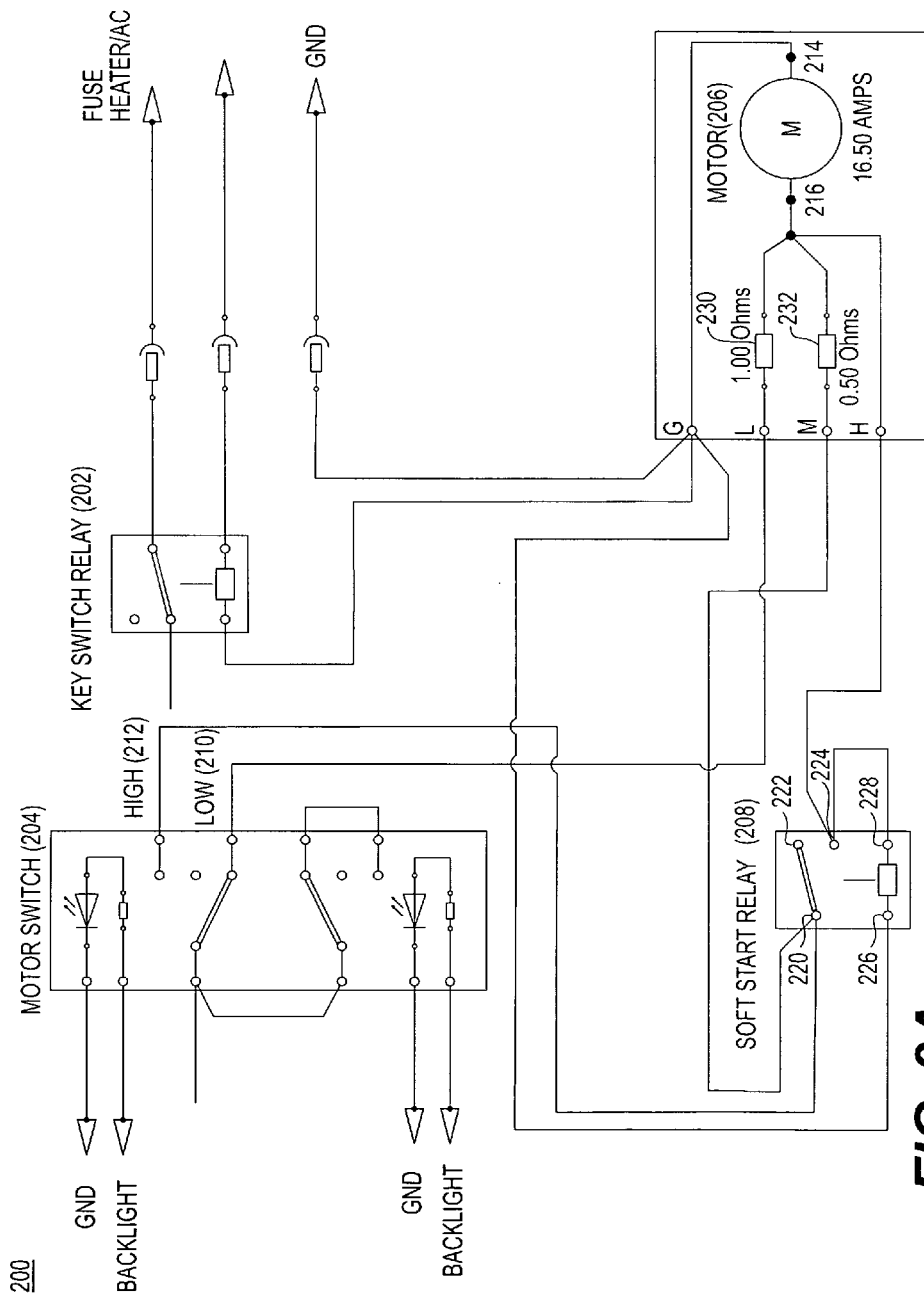
FIG. 2A is a diagrammatic and schematic illustration of one exemplary disclosed soft start motor control and motor configured to low speed for use with the machine of FIG. 1.
Figure 2B:
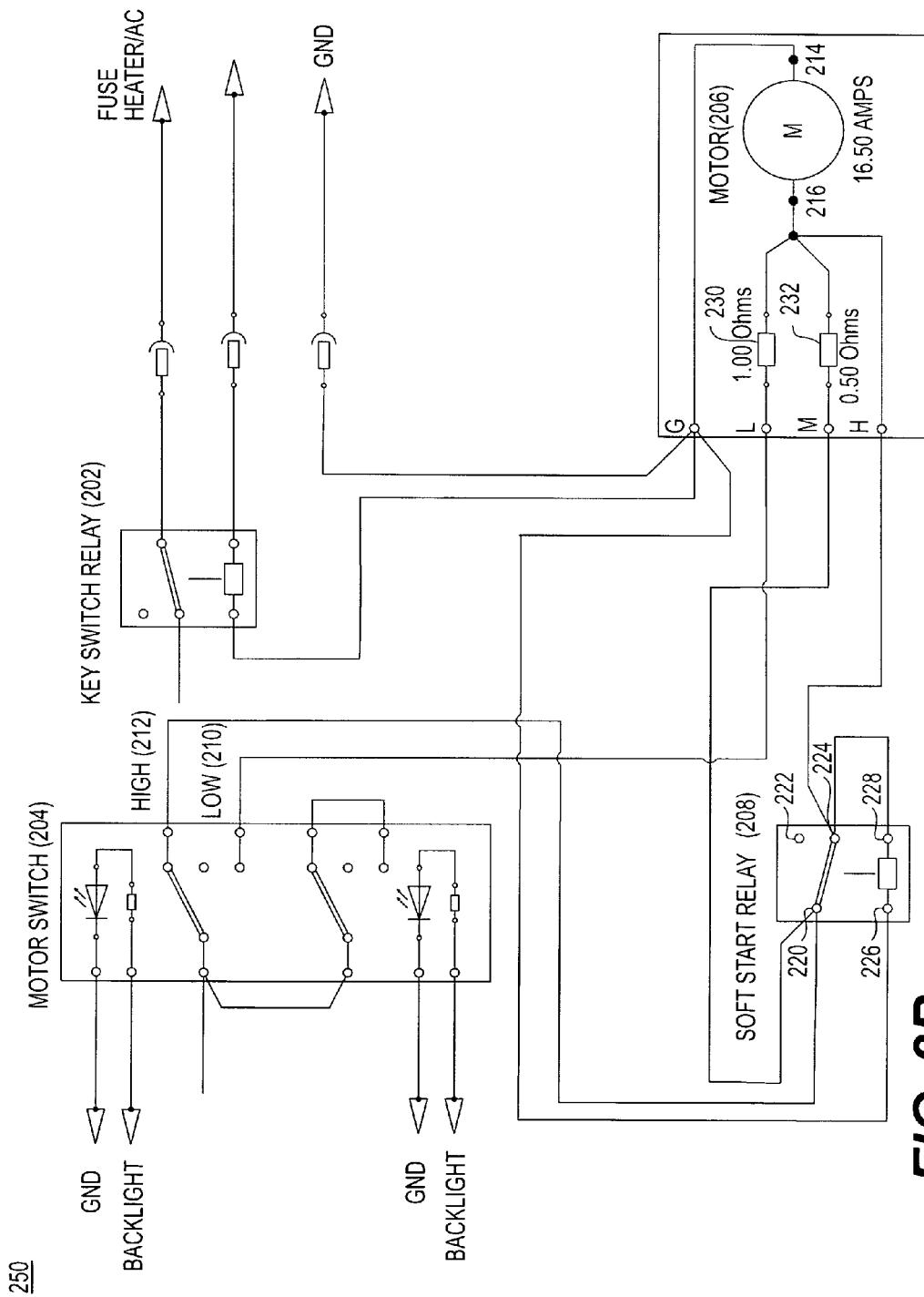
FIG. 2B is a diagrammatic and schematic illustration of one exemplary disclosed soft start motor control and motor configured to high speed for use with the machine of FIG. 1.

FIG. 2A may illustrate a schematic illustration 200 of one exemplary disclosed soft start motor control and motor configured to low speed. FIG. 2B illustrates a schematic illustration 250 of one exemplary disclosed soft start motor control and motor configured to high speed. As illustrated in FIG. 2A, a machine 100 may include components that cooperate to transmit energy from machine 100 to a climate control system 108 and the other systems of machine 100. Climate control system 108 may be connected to a key switch relay 202 and may include a motor switch 204, a motor 206, and a soft start relay 208. Key switch relay 202 and motor switch 204 may combine to determine when motor 206 may be turned off, operate at low speed, or operate at high speed. In general, soft start relay 208 may be open when motor 206 is at low speed, and soft start relay 208 may be closed when motor 206 is at high speed.

Key switch relay 202 may be a relay configured to receive an on/off signal from an operator or a remote location. Key switch relay 202 when closed (on) may provide an electrical path for power source 102 to machine 100 subsystems such as heat and air conditioning, etc. When key switch relay 202 is configured in an off position, motor 206 may be inoperative. When key switch relay 202 is configured in an on position, motor switch 204 may provide power to motor 206.

Motor switch 204 may include a switch between high speed and low speed. Motor switch 204 may have a low speed terminal 210 and a high speed terminal 212. Motor switch 204 may only allow selecting one terminal at a time. If key switch relay 202 is open (off), motor switch 204 may be set to low speed or to high speed, and motor 206 may be inoperable. If key switch relay 202 is turned on, and motor switch 204 is set to low speed, motor 206 may start in current control mode. If key switch relay 202 is turned on, and motor switch 204 is set to high speed, motor 206 may start in current control mode because, as will be described later, the counter-electromotive force ("back-EMF") of motor 206 is insufficient to close soft start relay 208. When key switch relay 202 is closed (on), voltage from power source 102 may flow through motor switch 204 into low speed terminal 210 or high speed terminal 212 and then to motor 206.

Motor 206 may be an electric motor that runs on direct current (DC) electricity such as a DC motor. Motor 206 may be a brushed DC motor, a synchronous DC motor, or other DC motors known in the art. Motor 206 may use power provided by power source 102. Motor 206 may be rated at various amperages, such as, for example, 10 amps, 20 amps, or in one exemplary embodiment, 16.5 Amps. Motor 206 may have a motor low side 214 and a motor high side 216. Depending on the configuration of motor switch 204 and/or soft start relay 208, motor high side 216 may carry the back-EMF of motor 206 or voltage from power source 102. Motor 206 may be rated to operate at various voltages, for example, 12 volts, or in another example, 24 volts.

During normal operation of a DC motor 206, DC motor 206 may generate a counter-electromotive force ("back-EMF") which opposes the voltage applied to DC motor 206. Back-EMF may be the voltage, or electromotive force, that pushes against the current which induces the voltage or electromotive force. Back-EMF may be caused by a changing electromagnetic field. Back-EMF may be a voltage that occurs in electric motors where there is relative motion between the armature of the motor and the external magnetic field. As the speed of DC motor 206 is increased, the back-EMF may become equal to the voltage applied to DC motor 206.

Soft start relay 208 may be a relay or electrical switch that opens and closes under the control of another electrical or electronic circuit. In one exemplary embodiment, soft start relay 208 may be configured as a single pole double throw relay. Soft start relay 208 may have 5 terminals, including a common relay terminal 220, first relay terminal 222, a second relay terminal 224, a first relay coil terminal 226, and a second relay coil terminal 228. The voltage across first relay coil terminal 226 and second relay coil terminal 228 may determine if soft start relay 208 is open or closed. If the voltage across first relay coil terminal 226 and second relay coil terminal 228 is below a predetermined voltage, soft start relay 208 may be open, and common relay terminal 220 and first relay terminal 222 are electrically connected. Second relay terminal 224 may be electrically isolated through the relay from common relay terminal 220 and first relay terminal 222. If the voltage across first relay coil terminal 226 and second relay coil terminal 228 is equal to or above a predetermined voltage, soft start relay 208 may be closed. Common relay terminal 220 and second relay terminal 224 may be electrically connected and current may flow between common relay terminal 220 and second relay terminal 224. First relay terminal 222 may be electrically isolated through the relay from common relay terminal 220 and second relay terminal 224. The predetermined voltage may be any voltage above which no in-rush current may be expected to motor 206. In one exemplary embodiment, the predetermined voltage for a 12 volt motor 206 may be 4 volts. In other exemplary embodiment, the predetermined voltage for a 12 volt motor 206 may be between 2 volts and 10 volts. Additional embodiments may include motors 206 that operate at different voltages, and the predetermined voltage may be, for example, between 15 percent and 85 percent of the maximum rated voltage of motor 206.

Low speed resistor 230 may have a first low speed resistor 230 terminal and a second low speed resistor 230 terminal. Low speed resistor 230 may be sized as to limit the current flow from power source 102 to motor 206 during start up of motor 206 on low speed or a stall condition on motor 206 during low speed. In one exemplary embodiment, motor 206 may be 12 volts, and low speed resistor 230 may be one ohm. The maximum current through low speed resistor 230 may be 12 Amps. In other exemplary embodiments low speed resistor 230 may be sized between 0.3 ohms and 2 ohms. For example, the maximum current through low speed resistor 230, depending on low speed resistor 230 size, may be between 6 Amps and 40 Amps for a 12 volt motor 206 and 12 Amps and 80 Amps for a 24 volt motor 206. In many embodiments, it may be desirable to keep the maximum current through low speed resistor 230 below 24 amps.

High speed resistor 232 may have a first high speed resistor 232 terminal and a second high speed resistor 232 terminal. High speed resistor 232 may be sized as to limit the current flow from power source 102 to motor 206 during start up of motor 206 on high speed or a stall condition on motor 206 during high speed. In one exemplary embodiment, motor 206 may be 12 volts, and high speed resistor 232 may be one half of an ohm. The maximum current through high speed resistor 232 may be 24 Amps. High speed resistor 232 may be sized between 0.2 ohms and 2 ohms. For example, the maximum current through high speed resistor 232, depending on high speed resistor 232 size, may be between 6 amps and 60 amps for a 12 volt motor 206 and 12 amps and 120 amps for a 24 volt motor 206. In many embodiments, it may be desirable to keep the maximum current through high speed resistor 232 below 24 amps.

The exemplary embodiment illustrated in FIGS. 2A and 2B controls in-rush current and relay chatter by the use of isolated low speed resistor 230 and a single pole, double throw relay, such as soft start relay 208. In FIG. 2A, motor low side 214 and first relay coil terminal 226 may be electrically connected to ground. Motor high side 216 may be electrically connected to second relay coil terminal 228 through second relay terminal 224. Second low speed resistor 230 terminal, second high speed resistor 232 terminal, motor high side 216, and second relay terminal 224 may be electrically connected. Low speed terminal 210 may be electrically connected to first low speed resistor 230 terminal. High speed terminal 212 may be electrically connected to common relay terminal 220.

When key switch relay 202 is turned on, and motor switch 204 is set to low speed, motor 206 may turn on. The voltage on motor high side 216 may be the same as the back-EMF of motor 206. Soft start relay 208 may be open, and second relay terminal 224 and second relay coil terminal 228 may be electrically connected to motor high side 216. Because the voltage across first relay coil terminal 226 (ground) and second relay coil terminal 228 is below the predetermined voltage, soft start relay 208 may remain open. The current from power source 102 to motor 206 may only flow through low speed resistor 230. Ohms law (Current=Voltage/Resistance) may limit the current flowing through low speed resistor 230 from motor switch 204 low speed terminal 210 to motor 206, controlling the in-rush current. Once the voltage across first relay coil terminal 226 (ground) and second relay coil terminal 228 is equal to or above the predetermined voltage, soft start relay 208 may close.

As shown in FIG. 2B, when soft start relay 208 is closed, motor high side 216 may be electrically connected with second relay terminal 224, and second relay terminal 224 may be electrically connected with common relay terminal 220. Common relay terminal 220 may be electrically connected with motor switch 204 high speed terminal 212. The result may be motor high side 216 is electrically connected to high speed terminal 212 when soft start relay 208 is closed. It should be noted that motor high side 216 may be electrically connected to second high speed resistor 232 terminal. First high speed resistor 232 terminal may be electrically connected to high speed terminal 212.

When the voltage across first relay coil terminal 226 (ground) and second relay coil terminal 228 is below the predetermined voltage, DC motor 206 is being operated in a current control mode, or a motor 206 first mode. If motor switch 204 is switched from low speed terminal 210 to high speed terminal 212 before soft start relay 208 closes, the current to motor 206 may only flow through high speed resistor 232. Ohms law (Current=Voltage/Resistance) may limit the current flowing through high speed resistor 232 from motor switch 204 high speed terminal 212 to motor high side 216, controlling the in-rush current. The high speed resistor 232 may also limit the current flowing from high speed terminal 212 when motor switch 204 is set to high speed and key switch relay 202 is turned on, or when motor 206 stalls, and motor switch 204 is set to high speed, and soft start relay 208 opens because the back-EMF dropped below the predetermined voltage.

The predetermined voltage may be any voltage above which no in-rush current may be expected to motor 206. In one exemplary embodiment, the predetermined voltage for a 12 volt motor 206 may be 4 volts. In other exemplary embodiment, the predetermined voltage for a 12 volt motor 206 may be between 2 volts and 10 volts. Additional embodiments may include motors 206 that operate at different voltages, and the predetermined voltage may be, for example, between 15 percent and 85 percent of the maximum rated voltage of motor 206.

When motor switch 204 is set to high speed, and soft start relay 208 is closed, high speed terminal 212, common relay terminal 220, second relay terminal 224, second relay coil terminal 228, and motor high side 216 may all be electrically connected. Before soft start relay 208 closes, the voltage at second relay coil terminal 228 may be equal to the back-EMF. When the back-EMF voltage equals or increases above the predetermined voltage, soft start relay 208 may close, and the voltage at second relay coil terminal 228 may become equal to the voltage from power source 102. The operation of the soft start motor control prevents relay chatter when the current is no longer controlled, because the back-EMF voltage drop may not cause soft start relay 208 to oscillate between open and closed configuration. When the voltage across first relay coil terminal 226 (ground) and second relay coil terminal 228 is equal to or above the predetermined voltage and motor switch 204 is set to high speed, DC motor 206 is being operated in closed relay mode, or motor 206 second mode.

When motor switch 204 is set to low speed, and motor 206 stalls, if soft start relay 208 is open, low speed resistor 230 may continue to control the in-rush current. If soft start relay 208 is closed, the back-EMF may go to zero volts. The voltage across first relay coil terminal 226 (ground) and second relay coil terminal 228 may be below the predetermined voltage, and soft start relay 208 may open.

When motor switch 204 is set to high speed, and motor 206 stalls, high speed resistor 232 may continue to control the in-rush current. If soft start relay 208 is closed, the back-EMF may go to zero volts. Because the impedance of motor 206 during a stall is lower than that of the electrical path from power source 102 to motor 206, the voltage at second relay coil terminal 228 may be approximately the back-EMF. During a stall at high speed, the voltage across first relay coil terminal 226 (ground) and second relay coil terminal 228 may be below the predetermined voltage, and soft start relay 208 may open. When soft start relay is 208 open, high speed resistor 232 may control the in-rush current. The electrical path through motor switch 204, high speed terminal 212, common relay terminal 220, second relay terminal 224, to motor 206 may be longer than the electrical path inside motor 206, making the motor 206 impedance lower than the impedance of the electrical path. The various switches and relays in the electrical path may also increase the impedance of the electrical path.

If motor switch 204 is set to high speed when the voltage across first relay coil terminal 226 (ground) and second relay coil terminal 228 is equal to or above the predetermined voltage, soft start relay 208 may close. When soft start relay 208 closes, high speed resistor 232 prevents the back-EMF dropping and soft start relay 208 opening. When a relay, such as soft start relay 208, opens and closes rapidly, it may be called relay chatter. Soft start relay 208 may be in-parallel with high speed resistor 232 when soft start relay 208 is closed and the voltage across soft start relay 208 is the same or higher than the voltage across high speed resistor 232.

Figure 3A:
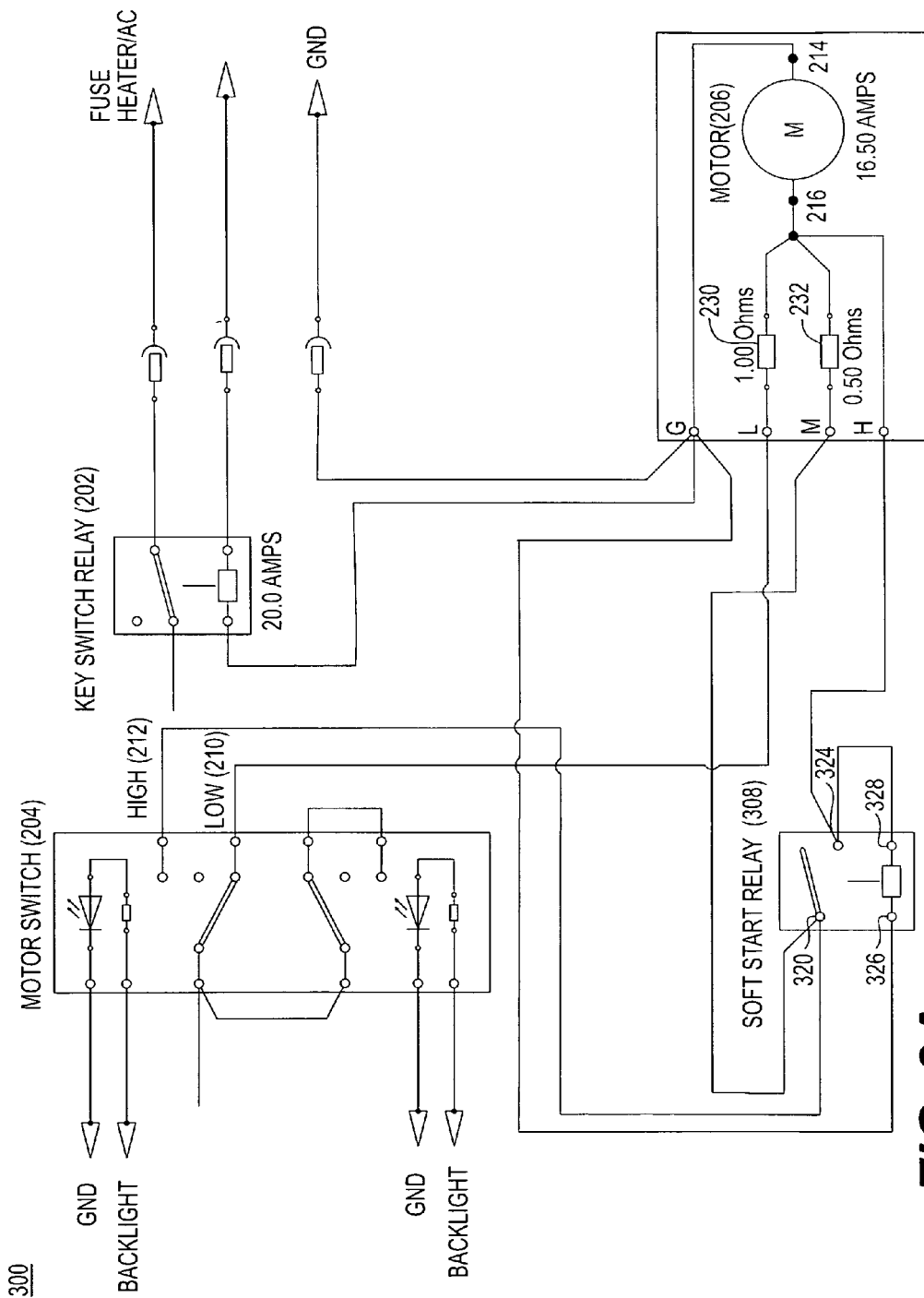
FIG. 3A is a diagrammatic and schematic illustration of a second exemplary disclosed soft start motor control and motor configured to low speed for use with the machine of FIG. 1.
Figure 3B:
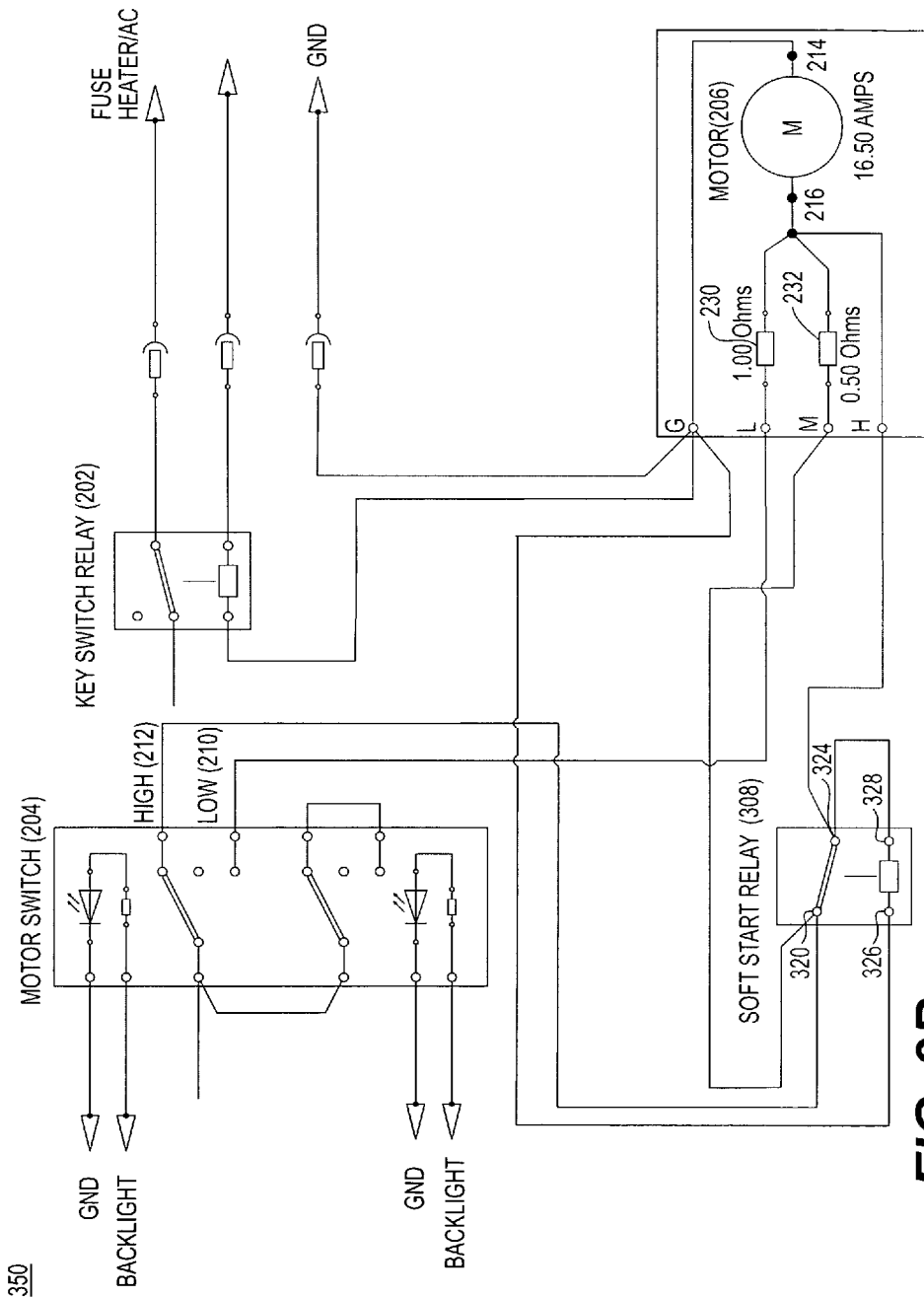
FIG. 3B is a diagrammatic and schematic illustration of a second exemplary disclosed soft start motor control and motor configured to high speed for use with the machine of FIG. 1.

FIG. 3A may illustrate a schematic illustration 300 of a second exemplary disclosed soft start motor control and motor configured to low speed. FIG. 3B illustrates a schematic illustration 350 of a second exemplary disclosed soft start motor control and motor configured to high speed. In the exemplary embodiment of FIGS. 3A and 3B, soft start relay 308 may be configured as a single pole single throw (SPST) relay, such as soft start relay 308. Soft start relay 308 may have 4 terminals, including a first relay terminal 320, a second relay terminal 324, a first relay coil terminal 326, and a second relay coil terminal 328. The voltage across first relay coil terminal 326 and second relay coil terminal 328 may determine if soft start relay 308 is open or closed. If the voltage across first relay coil terminal 326 and second relay coil terminal 328 is below a predetermined voltage, soft start relay 308 may be open, and no current may flow between first relay terminal 320 and second relay terminal 324. If the voltage across first relay coil terminal 326 and second relay coil terminal 328 is equal to or above a predetermined voltage, soft start relay 308 may be closed, and current may flow between first relay terminal 320 and second relay terminal 324.

The predetermined voltage of motor 206 in the FIGS. 3A and 3B embodiment may be similar to the predetermined voltage of motor 206 in FIGS. 2A and 2B embodiment, as previously discussed.

The exemplary embodiment illustrated in FIGS. 3A and 3B controls in-rush current and relay chatter by the use of isolated low speed resistor 230 and a single pole, single throw relay, such as soft start relay 308. In the FIG. 3A embodiment, motor low side 214 and first relay coil terminal 326 may be electrically connected to ground. Motor high side 216 may be electrically connected to second relay coil terminal 328. Second low speed resistor 230 terminal, second high speed resistor 232 terminal, motor high side 216, second relay terminal 324, and second relay coil terminal 328 may be electrically connected. Low speed terminal 210 may be electrically connected to first low speed resistor 230 terminal. High speed terminal 212 may be electrically connected to first relay terminal 320.

In the exemplary embodiment of FIG. 3A, when key switch relay 202 is turned on, and motor switch 204 is set to low speed, this embodiment may function in a manner similar to the embodiment discussed above in connection with FIG. 2A. However, the FIG. 3A embodiment uses soft start relay 308 instead of soft start relay 208 of the FIG. 2A embodiment.

Referring to FIG. 3B, when soft start relay 308 is closed, the FIG. 3B embodiment may function in a manner similar to the FIG. 2B embodiment, except that the FIG. 3B embodiment uses soft start relay 308 instead of soft start relay 208 of the FIG. 2B embodiment.

Referring to FIGS. 3A. and 3B, when the voltage across first relay coil terminal 326 (ground) and second relay coil terminal 328 is below the predetermined voltage, DC motor 206 is being operated in current control mode, or motor 206 first mode. The current control mode, or motor 206 first mode of the FIGS. 3A and 3B embodiment may function in a manner similar to the current control mode, or motor 206 first mode of the FIGS. 2A and 2B embodiment, except that the FIGS. 3A and 3B embodiment uses soft start relay 308 instead of soft start relay 208 of the FIGS. 2A and 2B embodiment.

When motor switch 204 is set to high speed, and soft start relay 308 is closed, DC motor 206 is being operated in closed relay mode, or motor 206 second mode. The closed relay mode, or motor 206 second mode of the FIG. 3B embodiment may function in a manner similar to the closed relay mode, or motor 206 second mode of the FIG. 2B embodiment, except that the FIG. 3B embodiment uses soft start relay 308 instead of soft start relay 208 of the FIG. 2B embodiment.

When motor switch 204 is set to low speed, and motor 206 stalls, low speed resistor 230 may continue to control the in-rush current. If soft start relay 308 is closed, the back-EMF may go to zero volts. The voltage across first relay coil terminal 326 (ground) and second relay coil terminal 328 may be below the predetermined voltage, and soft start relay 308 may open.

During a stall, when motor switch 204 is set to high speed, the FIG. 3B embodiment may function in a manner similar to the FIG. 2B embodiment during a stall when motor switch 204 is set to high speed, except that the FIG. 3B embodiment uses soft start relay 308 instead of soft start relay 208 of the FIG. 2B embodiment.

If motor switch 204 is set to high speed when the voltage across first relay coil terminal 326 (ground) and second relay coil terminal 328 is equal to or above the predetermined voltage, soft start relay 308 may close. The FIG. 3B embodiment functions in a manner similar to the FIG. 2B embodiment to prevent relay chatter, except that the FIG. 3B embodiment uses soft start relay 308 instead of soft start relay 208 of the FIG. 2B embodiment.

INDUSTRIAL APPLICABILITY

The disclosed soft start motor control may provide a way to control in-rush current into a motor 206 during start-up and stall, without using sensing or control circuits. Further, the disclosed soft start motor control may benefit from low costs, ease of replacement, and ease of assembly. The operation of the soft start motor control will now be described.

Referring to FIG. 1, when machine 100 is in operation, power source 102 may provide power to machine 100. When key switch relay 202 is closed (on) and motor switch 204 is set to low speed or high speed, power from power source 102 may be provided to motor 206 (referring to FIGS. 2A, 2B, 3A, and 3B). In the FIGS. 2A and 2B embodiment, when key switch relay 202 is on, and motor switch 204 is set to low speed, power from power source 102 may flow through low speed terminal 210, through low speed resistor 230, and into motor 206. Low speed resistor 230 controls the in-rush current. Once the voltage across first relay coil terminal 226 (ground) and second relay coil terminal 228 is equal to or above the predetermined voltage, soft start relay 208 may close. Power may continue to flow through low speed resistor 230, even when soft start relay 208 has closed, until motor switch 204 is switched to high speed.

When motor switch 204 is switched to high speed, the power from power source 102 may flow through high speed resistor 232 if soft start relay 208 is open, and if soft start relay 208 is closed, the current may flow across soft start relay 208 into motor 206. When soft start relay 208 is closed and motor switch 204 is set to high speed, second relay terminal 224 and second relay coil terminal 228 are electrically connected, and the voltage at second relay coil terminal 228 may be from power source 102 instead of the back-EMF. During a stall, when soft start relay 208 is closed and motor switch 204 is set to high speed, the impedance of motor 206 may be lower than the impedance of the electrical connection between power source 102 and motor 206, and soft start relay 208 may open because the back-EMF dropped below the predetermined voltage level.

In the FIGS. 3A and 3B embodiment, single pole, double throw soft start relay 208 may be replaced by single pole, single throw soft start relay 308. Otherwise the soft start motor control embodied in the FIGS. 3A and 3B embodiment functions in a manner similar to the soft start motor control in the FIGS. 2A and 2B embodiment. When soft start relay 308 is open and motor switch 204 is set to low speed, low speed resistor 230 may control the in-rush current to motor 206. When soft start relay 308 is open and motor switch 204 is set to high speed, high speed resistor 232 may control the in-rush current to motor 206. When soft start relay 308 is closed and motor switch 204 is set to high speed, the power from power source 102 may travel across soft start relay 308, and the voltage of power source 102 may keep soft start relay 208 closed, as discussed above. During a stall, when soft start relay 308 is closed and motor switch 204 is set to high speed, the impedance of motor 206 may be lower than the impedance of the electrical connection between power source 102 and motor 206, and soft start relay 308 may open because the back-EMF dropped below the predetermined voltage.

Because soft start relay 208 and 308 may be controlled directly by the back-EMF or voltage of power source 102, no sensing circuit is required to determine the state of motor 206. In addition, soft start relay 208 and 308 are controlled by the back-EMF or voltage of power source 102, and not a controller. Less space and cost is required for direct control of a relay as compared to sensing circuits and a controller for the relay. Further, the disclosed soft start motor control is simpler, with less components, and easier to assemble than comparable soft start motor controls that rely on sensors and a relay controller. Further, replacement or repair is simplified, since only a relay has to be investigated and replaced, as opposed to the relay, sensing circuits and a controller for the relay.

It will be apparent to those skilled in the art that various modifications and variations can be made to the soft start motor control of the present disclosure. Other embodiments of the soft start motor control will be apparent to those skilled in the art from consideration of the specification and practice of the soft start motor control disclosed herein. It is intended that the specification and examples be considered as exemplary only, with a true scope of the disclosure being indicated by the following claims.

What is claimed is:

1. A method of controlling in-rush current to a DC motor, comprising:
   operating the DC motor in a first mode including applying back-EMF across a relay coil to maintain a relay in an open configuration when the back-EMF is below a predetermined voltage; and
   operating the DC motor in a second mode including applying the back-EMF across the relay coil to maintain the relay in a closed configuration when the back-EMF is equal to or above the predetermined voltage.

2. The method of claim 1, wherein operating the DC motor in a first mode includes running the DC motor at a low speed or a high speed.

3. The method of claim 2, wherein operating the DC motor in a first mode further includes drawing current through a resistor.

4. The method of claim 1, wherein operating the DC motor in a second mode includes running the DC motor at a high speed.

5. The method of claim 1, further including preventing relay chatter.

6. The method of claim 5, wherein preventing relay chatter includes preventing a voltage drop in the back-EMF when the mode of the DC motor switches from the first mode to the second mode.

7. A soft start motor control for a DC motor, comprising:
   a motor switch;
   one or more resistors; and
   a relay configured to open when back-EMF of the DC motor across a relay coil is below a predetermined voltage, with current to the DC motor being controlled by the one or more resistors and configured to close when the back-EMF of the DC motor across the relay coil is equal to or above the predetermined voltage, with current to the DC motor traveling across the relay.

8. The soft start motor control of claim 7, wherein the one or more resistors includes a low speed resistor with a resistance between 0.3 ohms and 1.5 ohms.

9. The soft start motor control of claim 8, wherein the low speed resistor is 0.5 ohm.

10. The soft start motor control of claim 7, further including a device to reduce relay chatter.

11. The soft start motor control of claim 10, wherein the device is a high speed resistor in-parallel with the relay.

12. The soft start motor control of claim 11, wherein the high speed resistor is between 0.3 ohms and 2 ohms.

13. The soft start motor control of claim 7, wherein the DC motor is a 12 volt motor.

14. A machine, comprising:
   a DC motor; and
   a soft start motor control for the DC motor, including:
      a motor switch configured to switch between a low speed terminal and a high speed terminal;
      a low speed resistor including a first low speed resistor terminal and a second low speed resistor terminal;
      a relay, including:
         a common relay terminal;
         a first relay terminal;
         a second relay terminal;
         a first relay coil terminal; and
         a second relay coil terminal;
      wherein the relay is open when the back-EMF of the DC motor at the second relay coil is below a predetermined voltage, with current to the DC motor being controlled by the low speed resistor; and
      wherein the relay is closed when the back-EMF of the DC motor at the second relay coil is equal to or above the predetermined voltage, with current to the DC motor traveling across the relay.

15. The machine of claim 14 further including a power source configured to power one or more operations of the machine;
   a traction device coupled to the power source to move the machine; and
   a climate control system powered by the power source, wherein the climate control system includes the DC motor.

16. The machine of claim 14, wherein a DC motor low side is electrically connected to ground, the first relay coil terminal is electrically connected to ground, a DC motor high side is electrically connected to the second relay coil terminal, the second low speed resistor terminal, the DC motor high side, and the second low speed relay terminal are electrically connected, the low speed terminal is electrically connected to the first low speed resistor terminal, and the high speed terminal is electrically connected to the common relay terminal.

17. The machine of claim 14, wherein the low speed resistor is between 0.3 ohms and 1.5 ohms.

18. The machine of claim 14, further including a high speed resistor with a first high speed resistor terminal and a second high speed resistor terminal wherein:

the first high speed resistor terminal, the second low speed resistor terminal, the DC motor high side, and the second low speed relay terminal are electrically connected; and the first high speed resistor terminal, the high speed terminal, and the common relay terminal are electrically connected.

19. The machine of claim 18, wherein the high speed resistor is between 0.3 ohms and 2 ohms.

20. The machine of claim 14, wherein the DC motor is a 12 volt motor.

* * * * *